Dec. 6, 1927.

M. J. TRUMBLE 1,651,647

APPARATUS FOR RECOVERING THE VOLATILE PRODUCTS FROM CARBONACEOUS MATERIAL

Filed July 11, 1922    2 Sheets-Sheet 1

INVENTOR:
MILON J. TRUMBLE,
BY
Graham + Hamm
ATTORNEYS.

Dec. 6, 1927. 1,651,647
M. J. TRUMBLE
APPARATUS FOR RECOVERING THE VOLATILE PRODUCTS FROM CARBONACEOUS MATERIAL
Filed July 11, 1922 2 Sheets-Sheet 2

INVENTOR:
MILON J. TRUMBLE,
BY
Graham + Lewis
ATTORNEYS.

Patented Dec. 6, 1927.

1,651,647

UNITED STATES PATENT OFFICE.

MILON J. TRUMBLE, OF ALHAMBRA, CALIFORNIA.

APPARATUS FOR RECOVERING THE VOLATILE PRODUCTS FROM CARBONACEOUS MATERIAL.

Application filed July 11, 1922. Serial No. 574,269.

My invention relates to the art of recovering volatile oils from carbonaceous substance such as lignite.

The principal object of the invention is to provide an apparatus in which such carbonaceous substances may be treated to remove the volatile portions thereof.

The apparatus illustrated is particularly adapted to the treatment of lignite and the specification will be limited to this application, the scope of the invention being limited, however, only by the attached claims.

It is an object of the invention to provide an apparatus in which an internally heated retort is used, this retort being heated by hot vapor, preferably steam, which is injected into and passed through the carbonaceous substance in the retort for the purpose of heating the hydrocarbon, distilling the volatiles therefrom and providing a carrier with which the volatiles are delivered to suitable condensers.

It is a further object of the invention to provide means by which the internal temperature of the retort may be accurately controlled.

It is a still further object of the invention to fractionate the resulting vapors by means of dephlegmators.

It is a still further object of the invention to utilize certain waste heat for the purpose of providing preliminary drying of the raw material.

It is a still further object of the invention to provide an apparatus which is continuous in operation and in which a very high heat economy is maintained.

Further objects and advantages will be evident hereinafter.

Referring to the drawing which is for illustrative purposes only, Fig. 1 is a somewhat diagrammatic view of a plant embodying the features of my invention.

Fig. 3 is a section through one form of hydrogenator.

Figure 1:
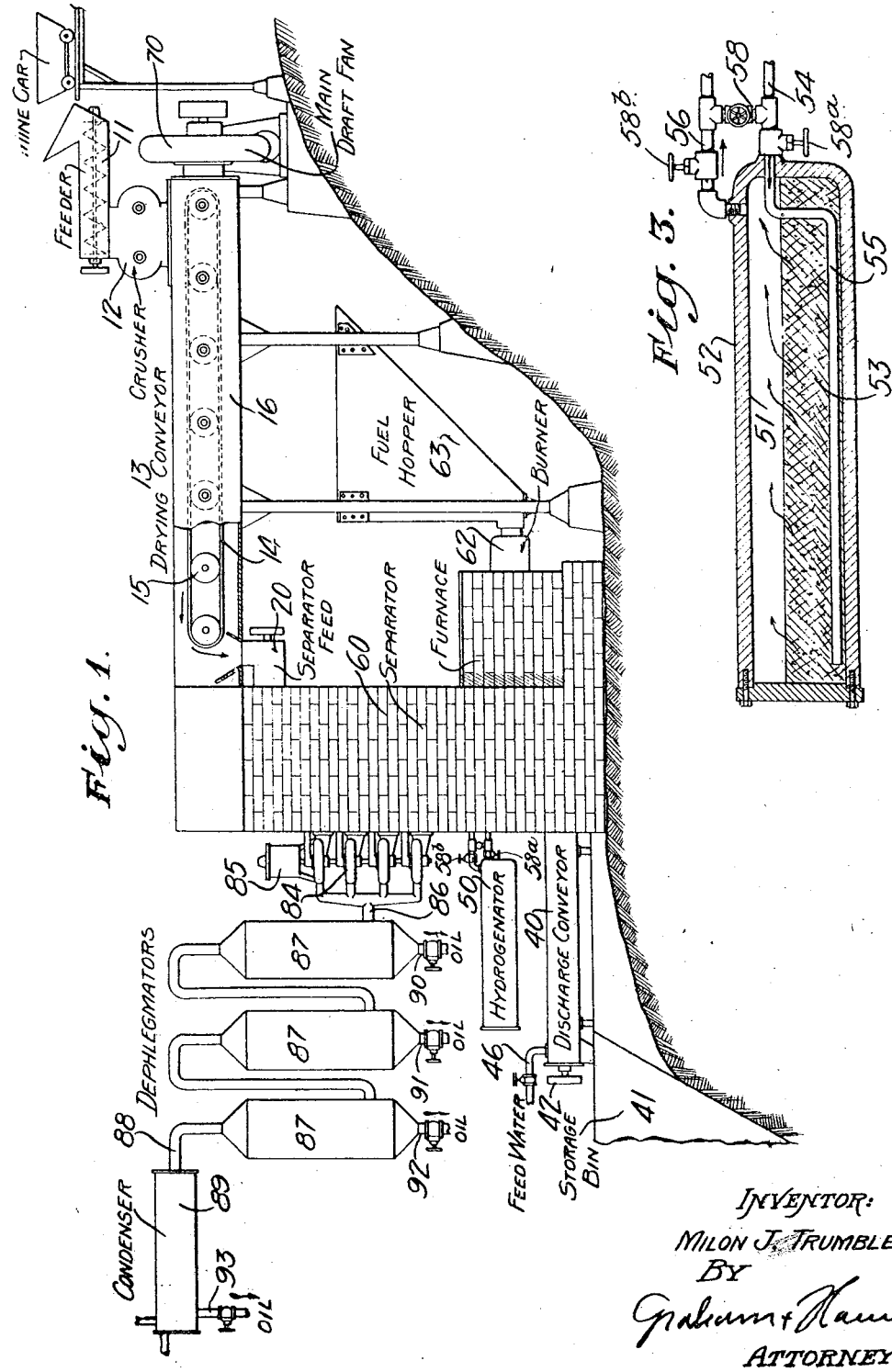

As explained above, this plant is especially adapted to treat lignite. The plant as shown consists of a feeder 11 which delivers the raw material into a crusher 12, the material being delivered from the crusher 12 to a drying conveyor 13 which is preferably formed of a steel belt 14, carried on suitable rolls 15 in an enclosed housing 16. The material is delivered from the drying conveyor into a separator feeder 20 and from this separator feeder 20 into the separator 30. The separator feeder 20 consists of an enclosed housing 21, having a spiral conveyor 22 carried therein, this conveyor being driven from any suitable source by means of a pulley 23.

The raw material is delivered into the top of the separator 30, this separator consisting of a tight shell having cones 31, 32, 33, and 34 therein. Cones 31 and 33 have their apexes pointing upwardly and the cones 32 and 34 have their apexes pointing downwardly, the apexes being, however, cut off the cones 32 and 34 to provide openings through which the material flows. The material delivered by the feeder 20 is delivered to the apex of the cone 31 by means of a small cone 35, flowing downwardly over the cones 31, 32, 33 and 34.

Figure 2:
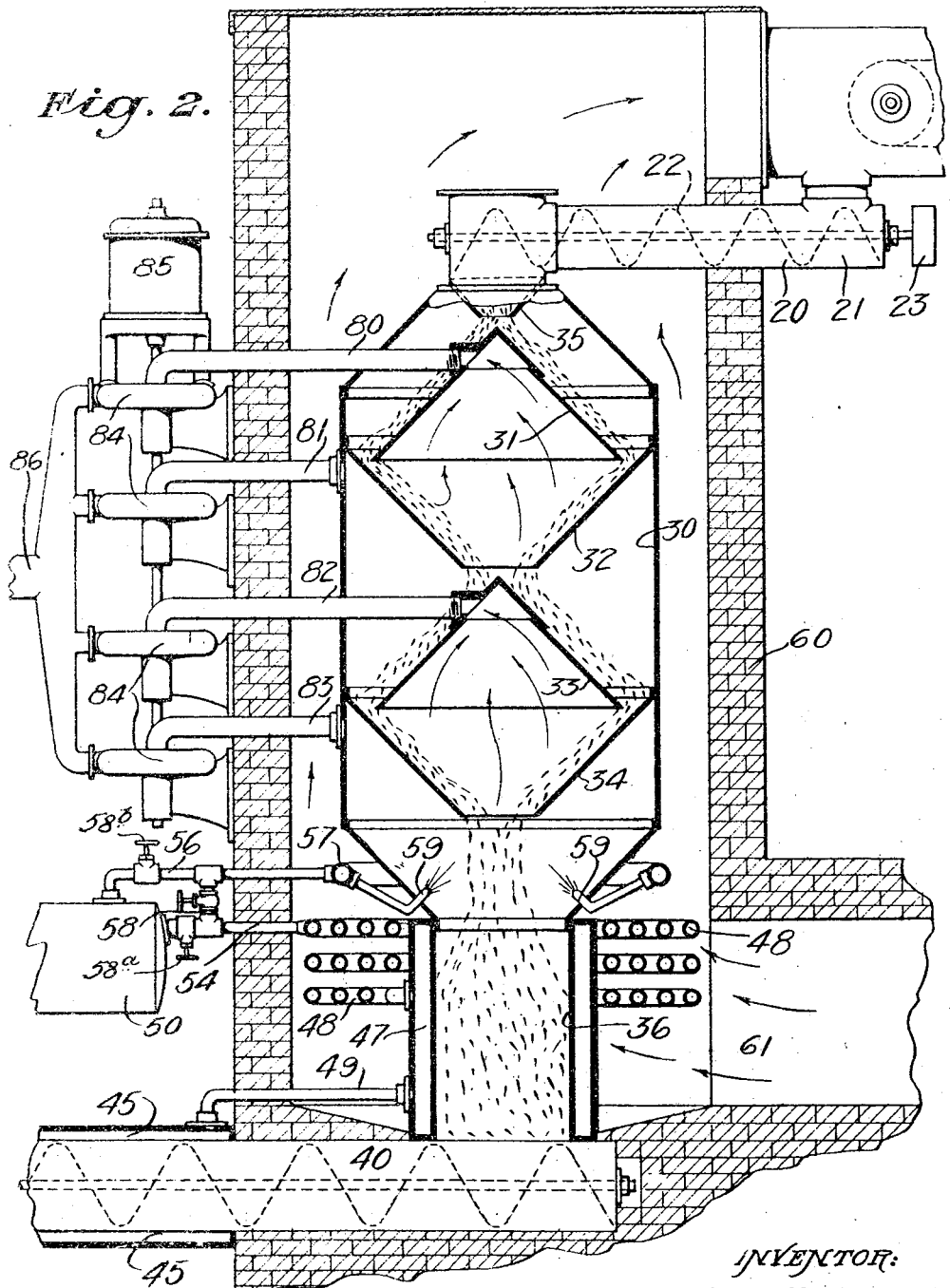
Fig. 2 is a cross-section through the center of a preferred form of separator or retort.

As shown in Fig. 2 of the drawing, material is finally delivered into a cylindrical extension 36 from which it is removed by means of discharge conveyor 40. The discharge conveyor 40 delivers the material to a storage bin 41; discharge conveyor 40 is driven by means of a pulley 42.

Surrounding the discharge conveyor 40 is a jacket 45 into which feed water is delivered through a pipe 46. The heated residue from the separator passes through the conveyor 40 and heats the feed water in the jacket 45, this water then being delivered through a pipe 49 into a jacket 47 surrounding the cylindrical portion 36. This heated feed water is then carried through a superheater 48, being delivered from this superheater into a hydrogenator 50.

The hydrogenator 50 as shown in Fig. 3 consists of a shell 51, surrounded by heat insulation 52 and filled with reducing material 53. This reducing material may consist of common salt and iron oxide either in the form of iron turnings or filings, or in the form of magnetic ore.

The superheated steam is delivered through a pipe 54 into the bottom of the hydrogenator through a perforated pipe 55, the steam blowing up through the reducing material and being carried through a pipe 56 into a steam header 57. A bypass pipe and valve 58 provided with the necessary valves 58ª and 58ᵇ allows a hydrogenator to be cut out of service if desired.

In its passage through the hydrogenator a small portion of the steam is reduced producing free hydrogen which is injected with the steam through nozzles 59 placed in the bottom of the separator 30. The separator 30 and the superheater 48 are placed in a suitable furnace 60 which is heated through an opening 61 by means of a burner 62 fed with finely pulverized fuel from a fuel hopper 63.

When operating upon lignite, material from the storage bin 41 forms an excellent fuel, being blown in powder form into the interior of the furnace, the hot gases of which act upon the steam in the superheater 48 and in the jacket 47, passing upwardly around the separator 30 and into the enclosure 16 about the drying conveyor, draft being maintained by means of a main draft fan 70 which pulls the products of combustion through the conduit 16. These hot gases acting upon the material on the belt 14 tend to drive out the moisture therefrom prior to its delivery into the feeder 20.

The object of passing the hot gases around the separator 30 is primarily to prevent loss of heat therefrom, the superheated steam and hydrogen delivery through the nozzles 59 being largely depended upon this for heating.

It will be noted that the material is fed continually through the separator 30 falling downwardly therethrough in a thin layer on the cones 31, 32, 33, and 34, and being in intimate contact with the heated steam and hydrogen carried in the separator 30. Distillation therefore takes place, the volatile portion of the lignite being turned to vapor and mixed with the steam delivered through the nozzles 59.

The water and oil vapors are withdrawn through pipes 80, 81, 82, and 83 by means of centrifugal blowers 84 which are driven by a motor 85. It will be noted that each of the fans 84 operates on a certain portion of the separator 30 and by a suitable proportioning of these fans or the piping thereto exactly the proper amount of vapor may be withdrawn from each point.

All of the vapors are delivered from the fans 84 through a pipe 86 into a series of dephlegmators 87 and through a pipe 88 into a condenser 89.

The dephlegmators are of any well known form, being so constructed that the vapors in passing therethrough are cooled, the condensates being delivered through pipes 90, 91, and 92, to suitable storage not shown. A final condensation is provided in the condenser 89, oil therefrom being delivered through a pipe 93.

It will be obvious that the oil delivered through the pipes 90, 91, 92, and 93 is of progressively lower boiling point, the vapors being fractionated by the use of the dephlegmators 87 and the condenser 89.

The oil delivered from the pipes 90, 91, 92, and 93 is a valuable product as is also the material delivered from the discharge conveyor 40 into the storage bin 41.

I claim as my invention:

1. In an apparatus of the character described, the combination of: a separator comprising oppositely disposed conical elements arranged in a substantially vertical series; means for applying heated gases to said separator out of contact with material in said separator; a conveyor system for delivering material into the top of said separator; and means whereby the material, while passing through said conveyor system to said separator, is brought into direct contact with said gases from heating means.

2. In an apparatus of the character described, the combination of: a separator comprising oppositely disposed conical elements arranged in a substantially vertical series; means for applying hot gases to said separator out of contact with the material in said separator; a conveyor system for delivering material into the top of said separator; and means whereby the material, while being conveyed to said separator, is brought into direct contact with said gases after the latter have been applied to said separator.

3. In an apparatus for recovering volatile products from carbonaceous material, the combination of: a separator; means for applying heat to said separator; a conveyor system for delivering prepared material to said separator; means whereby the materials being conveyed to said separator will be subjected to the waste heat not utilized by said separator; a discharge conveyor for taking treated material from said separator; a steam generator; means for delivering steam from said generator into said separator; and a water jacket surrounding said discharge conveyor and in communication with said steam generator for absorbing heat from said treated material to preheat the feed water for said generator.

4. In an apparatus for recovering volatile products from carbonaceous material, the combination of: a separator; means for applying heat to said separator; a conveyor system for delivering prepared material to said separator; means whereby the materials being conveyed to said separator will be subjected to the waste heat not utilized by said separator; a discharge conveyor for taking treated material from said separator; a steam generator; a hydrogenator for treating the steam from said generator; means for delivering said steam into said separator; and a water jacket surrounding said discharge conveyor and in communication with said steam generator for absorbing heat from said treated material to preheat the feed water for said generator.

5. In an apparatus for recovering volatile products from carbonaceous material, the combination of: a separator; means for applying heat to said separator; a conveyor system for delivering prepared material to said separator; a discharge conveyor for taking treated material from said separator; a steam generator; means for delivering steam from said generator into said separator; and a water jacket surrounding said discharge conveyor in communication with said steam generator for absorbing heat from said treated material to preheat the feed water for said generator.

6. In an apparatus for recovering volatile products from carbonaceous material, the combination of: a separator; means for applying heat to said separator; a conveyor system for delivering prepared material to said separator; a discharge conveyor for taking treated material from said separator; a steam generator; a hydrogenator for treating the steam from said generator; means for delivering said steam to said separator; and a water jacket surrounding said discharge conveyor in communication with said steam generator for absorbing heat from said treated material to preheat the feed water for said generator.

7. In an apparatus of the class described, the combination of: a shell; means for injecting steam into said shell; means for applying heat to said shell; means for delivering carbonaceous material into the top of said shell; a series of conical members disposed within said shell with their apexes upwardly directed, for deflecting said material outwardly; a funnel disposed beneath each of said conical members for directing said material inwardly, so that said material will be delivered upon the apex of each succeeding conical member; pipes providing take-off passages for volatile products communicating with the interior of each of said conical members; and a pipe connecting into said shell at the level of each funnel, for removing volatile products therefrom.

8. In an apparatus of the character described, the combination of: a separator; means for heating said separator, said heating means being out of contact with the material in said separator; means whereby the material being brought to said separator is brought into direct contact with the heat not utilized by said separator; a steam generator; a hydrogenator for treating the steam from said generator; and means for delivering said steam from said hydrogenator into said separator.

9. In an apparatus of the character described: a separator; means for applying hot gases to said separator out of contact with the material in said separator; means whereby the material being brought to said separator is brought into direct contact with the heat of said gases not utilized by said separator; a steam generator; a hydrogenator for treating the steam from said generator; means for delivering said steam from said hydrogenator into said separator; means for removing treated material; and a water jacket surrounding said removing means and in communication with said steam generator for absorbing heat from the material which has been treated in said separator to preheat the feed water delivered to said steam generator.

10. In an apparatus of the character described, the combination of: a separator; a conveyor system for delivering carbonaceous material to said separator; means for supplying heat to said separator, said heating means being out of contact with the carbonaceous material in said separator; means whereby the material being conveyed to said separator is brought into direct contact with the heat of said heating means not utilized by said separator; a steam generator for delivering steam from said generator into said separator; means for removing treated material; and a water jacket surrounding said removing means and in communication with said steam generator for absorbing heat from the carbonaceous material which has been treated in said separator to preheat the said water for said generator.

11. In an apparatus of the character described, the combination of: a separator; means for introducing into said separator a heating agent for heating the material in said separator; means for transferring heat from the material treated in said separator to said agent to preheat the latter before it enters said separator; a series of conical members disposed within said shell with their apexes upwardly directed for deflecting outwardly the material in said separator; a funnel disposed beneath each of said conical members for directing inwardly the material in said separator, so that said material will be delivered upon the apex of each succeeding conical member; and pipes providing take-off passages for volatile products, said pipes communicating with the interior of each of said conical members.

12. In an apparatus of the character described, the combination of: a separator; means for introducing into said separator a heating agent for heating the material in said separator; means for transferring heat from the material treated in said separator to said agent to preheat the latter before it enters said separator; a series of conical members disposed within said shell with their apexes upwardly directed for deflecting outwardly the material in said separator; a funnel disposed beneath each of said conical members for directing inwardly the material in said separator, so that said material will be delivered upon the apex of each succeeding conical member; pipes providing take-off passages for volatile products, said pipes communicating with the interior of each of said conical members; and means to preheat feed water delivered to a steam generator surrounding an extension of said superheater.

13. In an apparatus of the character described, the combination of: a separator; means for heating said separator, said heating means being out of contact with the material in said separator; means whereby the material being brought to said separator is brought into direct contact with the heat not utilized by said separator; means for introducing into said separator a heating agent for heating the material in said separator; means for transferring heat from the material which has been treated in said separator to said agent to preheat said agent before the latter enters said separator; and pipes connected to said separator at different levels thereof for removing volatile products released from the material treated in the separator.

14. In an apparatus of the character described, the combination of: a separator comprising oppositely disposed conical elements, arranged in a substantially vertical series; means of supplying heat to said separator, the gaseous source of said heat being out of contact with the material, while said material is in said separator; and means whereby the material, before being brought into the top of said separator is brought into direct contact with said gaseous source of heat, a portion of said heat having been first utilized by the separator.

In testimony whereof, I have hereunto set my hand at Los Angeles, California, this 6th day of July, 1922.

MILON J. TRUMBLE.